(12) United States Patent
Abecassis

(10) Patent No.: US 7,605,206 B2
(45) Date of Patent: Oct. 20, 2009

(54) METHOD OF COMPATIBILIZING NON POLYMER SOLID FILLERS IN POLYMERIC MATERIALS AND COMPOSITIONS THEREFROM

(75) Inventor: David Abecassis, Huntington, NY (US)

(73) Assignee: Glen Burnie Technologies, LLC, Glen Burnie, MD (US)

( * ) Notice: Subject to any disclaimer, the term of this patent is extended or adjusted under 35 U.S.C. 154(b) by 329 days.

(21) Appl. No.: 11/593,454

(22) Filed: Nov. 6, 2006

(65) Prior Publication Data

US 2007/0106007 A1 May 10, 2007

Related U.S. Application Data

(60) Provisional application No. 60/733,678, filed on Nov. 4, 2005.

(51) Int. Cl.
*C08K 3/34* (2006.01)
*C08K 5/523* (2006.01)
(52) U.S. Cl. .................................... 524/445; 524/127
(58) Field of Classification Search ................ 524/445, 524/127
See application file for complete search history.

(56) References Cited

U.S. PATENT DOCUMENTS

| | | | |
|---|---|---|---|
| 6,350,804 B2 * | 2/2002 | Adedeji et al. | 524/445 |
| 6,423,768 B1 * | 7/2002 | Khouri | 524/445 |
| 6,683,122 B1 * | 1/2004 | Zilg et al. | 523/205 |
| 7,144,632 B2 * | 12/2006 | Hayes | 428/423.7 |
| 2004/0223208 A1 * | 11/2004 | Yu et al. | 359/296 |
| 2006/0155035 A1 * | 7/2006 | Metzemacher et al. | 524/445 |
| 2006/0293430 A1 * | 12/2006 | Wang et al. | 524/445 |

FOREIGN PATENT DOCUMENTS

| | | | |
|---|---|---|---|
| EP | 0427300 | * | 10/1984 |
| WO | WO 0061683 | | 10/2000 |
| WO | WO 0168760 | | 9/2001 |
| WO | WO 0222729 | | 3/2002 |
| WO | WO 03055792 | | 7/2003 |
| WO | WO2004/063260 | * | 7/2004 |
| WO | WO 2006080714 | | 8/2006 |

* cited by examiner

*Primary Examiner*—Peter Szekely
(74) *Attorney, Agent, or Firm*—Thomas A. O'Rourke; Bodner & O'Rourke, LLP

(57) ABSTRACT

A method of forming a compatibilized blend of a polymeric material and one or more additives and/or fillers is disclosed. The method includes blending the polymeric material and or more additives and/or fillers with an exfoliated clay.

32 Claims, No Drawings

METHOD OF COMPATIBILIZING NON POLYMER SOLID FILLERS IN POLYMERIC MATERIALS AND COMPOSITIONS THEREFROM

The present application claims priority on U.S. Provisional application Ser. No. 60/733,678, filed Nov. 4, 2005 the disclosures of which are incorporated herein by reference.

FIELD OF THE INVENTION

The present invention is directed to improved polymeric blends containing one or more additives or fillers. The compositions have been compatibilized with an exfoliated clay.

BACKGROUND OF THE INVENTION

A wide variety of polymers are available for a number of applications. Many of these polymers are modified by the addition of one or more additives to facilitate processing of polymers or to improve their properties. Most commercial polymers cannot be used without one or more additives used to modify the properties of the polymer in some way. Certain additives are used to overcome or enhance a polymer's properties in a particular application. For example, some polymers need to have their slip property enhanced in order to facilitate the formation of thin films of the polymer or in connection with the use of a polymer in a particular application. As a result, a processor may add one or more slip agents to the polymer during the extrusion process.

These slip agents and other additives are not typically compatible with the polymers they are extruded with and a portion of the slip agent migrates to the surface of the polymer film. In this example, the migration of the slip agent is a beneficial result. However, because many of the additives used in polymer processing are not compatible with the polymers, migration can occur with other polymer-additive blends. In these instances, the migration or bloom of the additive on the surface of the polymer film can be a defect. Other additives, such as antioxidants, light stabilizers and fire retardants are expected to remain in the polymer throughout its service life, which requires solubility. Precipitation of such additives on the polymer surface (blooming) is undesirable. Even in applications where migration is desired, there may be initially too much migration and not enough migration over time because the incompatibility of the polymer and the additive. As a result, the polymer can deteriorate or lose its properties over time because of the incompatibility of the polymer and the additive. Long-chain polar compounds like erucamide are widely used for anti-static, anti-fog, mould release and slip enhancing properties. These depend on incompatibility of the additive with the polymer and its migration to the surface. Proper performance of such additives implies that they should have a limited solubility in the polymer, and migrate to the surface at a suitable rate.

As additives migrate or bloom to the polymer surface, the ability to print, seal or coat the surface may suffer. This effects coating adhesion, lamination peels strength, and peel and blister resistance. Serious blooming can also affect surface aesthetics. White chalking on dark molded parts would be a typical example. Migration during processing can also cause buildup of additives on extruder dies and molding tool surfaces with obvious problems for the producer. Plasticizers are another type of additive that can migrate to the surface of a polymer. Flexible PVC and cellulose acetate are examples of plastics containing significant quantities of plasticizer and are the ones most likely to show effects of plasticizer migration. Loss of plasticizer causes the material to stiffen but not generally so much as to cause brittleness—flexible materials should therefore be supported in their natural shape so that they do not become 'set' in a distorted condition. Uneven loss of plasticizer from cellulose acetate plastic is responsible for distortion and is quite common with objects made from this material. It is often also, however, a sign that the cellulose acetate is also chemically deteriorating; the plasticizer becomes less compatible with the degrading polymer and migrates to the surface.

The additives industry has always been plagued by the disadvantage that composite mixtures of polymers and solid additives pose. These disadvantages arise both in processing, and in the trade offs that non-isotropic dispersion of the solid material in the plastic material impose. Non uniform mixing means that mechanical properties vary too much throughout the resulting product for many uses. It also means that fillers are often rendered less effective per percentage additive loads. This is not uncommon, for example, in the field of flame retardant packages.

Compatibilizing issues arise not just with additives but also with other materials added to polymers and blends of polymers. For example, mechanical enhancers are commonly added to polymers in certain applications. These enhancers can include glass fiber or mineral fibers. Other materials can be fillers that reduce the amount of an expensive polymer used in an application. Mineral fillers are commonly used to lower the cost of the polymer materials in an application. Another application of an additive is a thermoplastic based composite such as polymer concrete. The use of additives and fillers in polymers and polymeric blends can be problematical. Many additives are not compatible with the polymers so it is difficult to disperse the additives throughout the polymer.

These solid phase materials fillers and additives normally introduce compounding issues resulting from anisotropic dispersion and non uniform distribution throughout the polymer phase. Traditionally these problems have been solved by modifying the plastic processing equipment to a higher degree of sophistication and subsequent cost. Chemical approaches are by their very nature, selective in the materials with which they are effective, and thus limited in scope.

Block copolymers and silanes have been used to attempt to better compatiblize the introduction of fillers into a thermoplastic polymer; but these approaches are most often preceded by chemical processing steps of the filler upstream from their addition into the thermoplastic polymer, and in this key respect do not constitute prior art since they can be classed as chemical compatibilization relying upon multi-step processing before being used in the final melt polymer processing.

U.S. Pat. No. 6,239,196 discloses a process for preparing blends of a filler and a polymer. In the process of the '196 patent a filler of solid particles is dispersed in a polymer by extrusion of a composition prepared by mixing an aqueous suspension of said filler with particles or granules of said polymer at a temperature below melting point of the polymer. The mixing is preferably carried out before entry into the region for melting the polymer in the extruder and the extrusion is carried out at a temperature sufficient to melt the polymer and insufficient to cause the filler of solid particles to melt. The water initially present in the composition is removed under the effect of the heat partly at the extruder inlet and the remainder at the degassing vent or vents situated along the extruder. The '196 patent relies upon the use of an aqueous suspension, and is limited in its range of materials. Although much has been published about the use of organically modified nanoclays in the nanocomposite field, little attention if any has been paid the transformation of interstitial surface energy between polymers and solids.

Common clays are naturally occurring minerals and are thus subject to natural variability in their constitution. The purity of the clay can affect final nanocomposite properties. Many clays are aluminosilicates, which have a sheet-like (layered) structure, and consist of silica $SiO_4$ tetrahedra bonded to alumina $AlO_6$ octahedra in a variety of ways. A 2:1 ratio of the tetrahedra to the octahedra results in smectite clays, the most common of which is montmorillonite. Other metals such as magnesium may replace the aluminium in the crystal structure. Depending on the precise chemical composition of the clay, the sheets bear a charge on the surface and edges, this charge being balanced by counter-ions, which reside in part in the inter-layer spacing of the clay. The thickness of the layers (platelets) is of the order of 1 nm and aspect ratios are high, typically 100-1500. The clay platelets are nanoparticulate. In the context of nanocomposites, it is important to note that the molecular weight of the platelets (ca. $1.3 \times 10^8$) is considerably greater than that of typical commercial polymers. In addition, platelets are not totally rigid, but have a degree of flexibility. The clays often have very high surface areas, up to hundreds of $m^2$ per gram. The clays are also characterized by their ion (e.g. cation) exchange capacities, which can vary widely. One important consequence of the charged nature of the clays is that they are generally highly hydrophilic species and therefore naturally incompatible with a wide range of polymer types. A necessary prerequisite for successful formation of polymer-clay nanocomposites is therefore alteration of the clay polarity to make the clay 'organophilic'. An organophilic clay can be produced from a normally hydrophilic clay by ion exchange with an organic cation such as an alkylammonium ion. Exfoliated clay differs from other flat particles such as mica or aluminum flakes in its thickness. The atoms within a single layer of clay are tightly bound together, but the forces between layers are relatively weak. It is therefore possible to insert molecules between the layers spreading them apart. Furthermore, under the correct physical and chemical conditions, one can completely separate one atomic layer from its neighbors above and below. Thus one has molecularly thin sheets that are typically about 10 Angstroms (or 1 nm) in thickness, and can be anywhere from 0.1 to 10 microns in extent. The use of such particles to reduce the permeability of polymers, as well as to improve mechanical properties is an important part of nanocomposite technology.

Accordingly, there is a need for a method of evenly dispersing a solid phase material throughout a polymer material.

OBJECTS OF THE INVENTION

It is an object of the invention to provide a process for compatibilizing solid phase additives in polymer compositions.

It is an object of the invention to provide a process for compatibilizing solid phase fillers in polymer compositions.

It is an object of the invention to provide polymer compositions with solid phase compatibilized additives present.

It is an object of the invention to provide polymer compositions with compatibilized solid phase fillers present.

SUMMARY OF THE INVENTION

In the present invention a thermopolastic polymer is blended with a nanoclay nanocomposite. More particularly, one or more exfoliated clays is used as a compatibilizer with a polymer or blends of two or polymers. The composition also includes one or more solid additives and/or fillers. The exfoliated clay compatibilizes the additive and/or filler with the polymeric material thereby permitting a blend that has superior properties than a traditional blend of a polymeric material and a solid filler and/or additive. In the present invention, there is a method of evenly dispersing a solid phase material throughout a polymer material. In one embodiment, for example, nanofillers are present which can physically absorb the interstitial energy difference between the solid phase surface and the polymer phase material. This is believed to be accomplished by transforming the surface energy differences between the solid phase and the polymer phase at the interface between the two phases and transforming the energy difference into mechanical deformation of the nanofiller particles at the interface.

The method of the present application has particular application with a variety of different types of additives. The additives that may be used with the present invention include but are not limited to antifoaming agents (foam suppressant), antifogging agents, antioxidants, antiozonants, antislip agents, antistatic agents, antitack (antiblock) agents, biocide/anti-bacterial agents, blowing/foaming agents, BOPP film modifiers, carbon black, chelating agents/complexing agents, clarifying agents, cling agents, crosslinking catalyst/Accelerator/Initiator, crosslinking or curing agents/hardener defoamers, deodorants, dessicants, dispensing agent emulsifiers, flame retardant/smoke suppressants, flatting (gloss control) agents, flexibilizers, fluorescent/whitening agents, fragrance gel inhibitors, heat stabilizers, hydrophilic agents, impact modifiers, infrared filters, inhibitor laser marking additives, leveling agents, light stabilizer/UV absorbers, lubricants and waxes, matting/gloss agents, melt strength enhancers, metal deactivators, nucleating agents, organic pigments, oxygen absorbers, oxygen barriers, peptizer, photoinitiators, photoselective agents, plasticizers, polymerization inhibitors, polymerization initiators, processing aids, release agents, slip agents, styrene suppressants, tackifiers, thickening agents, thixotropoic agents, titanium dioxide, viscosity modifiers, vulcanizing agents, wetting agents.

The types of polymers that are useful in the present invention include but are not limited to ABS, SAN/ASA, (acrylonitrile-styrenic based polymers), epoxies, epoxides, EVA (ethylene vinyl acetate copolymers), PA (polyamides), PBT (polybutylene terephthalate), PC (polycarbonate) polyesters, PE (polyethylene), PEN/PTT (polyethylene naphtalate, polytrimethylene), PET/PETG (polyetheylene terephtalate, polyethylene terephtalate glycol), PMMA (polymethylmethacrylate), PP (polypropylene), PS (polystyrene), PUR (polyurethane), PVC (polyvinyl chloride), rubbers, silicones, TPE (thermoplastic elastomers), TPU (thermoplastic polyurethane), UPR (unsaturated polyester) and others.

DETAILED DESCRIPTION OF THE INVENTION

In the present invention, one or more exfoliated clays is used as a compatibilizer with a polymer or blends of two or polymers. The composition also includes one or more solid additives or fillers. By the term polymer blends is meant a macroscopically homogeneous mixture of two or more species of polymer. The polymer blends can include homologous polymer blends, isomorphic polymer blends, polymer-polymer complexes, interpenetrating polymer networks and semi penetrating polymer network, etc. By the term interpenetrating polymer networks is meant a polymer comprising two or more polymer networks which are at least partially interlaced on a molecular scale, but not covalently bonded to each other and cannot be separated unless chemical bonds are broken. A semi-interpenetrating polymer network as used herein includes a polymer comprising one or more polymer network(s) and one or more linear or branched polymer(s) characterized by the penetration on a molecular scale of at least one of the networks by at least some of the linear or branched chains. The term polymer blends as used herein also includes a composite in which at least one component is a polymer as well as intercalcation, the process by which a substance becomes transferred into pre-existing spaces of molecular dimensions in a second substance.

The term additive as used herein includes any substance added to a polymer. The additive is typically a minor component of the mixture formed and usually modifies the property of the polymer. The term filler as used in here refers to any solid filler typically used with polymers including but not limited to sand, silica, talc etc.

In the present invention, a melt blend of one or more polymers, exfoliated clay and filler and/or additive is prepared and thoroughly blended together. In another embodiment, one or more polymers are melt blended with one or more fillers and/or additives. To the blended composition an exfoliated clay is added. The nanoclay preferably exfoliates in a thermoplastic prior to the addition of a solid state filler into the polymer phase. This order of mixing is preferred because the interstitial energy created at the interface by the surface energy difference between the filler material and the polymer is absorbed resulting in filler compatiblization within the polymer matrix. The resulting compatiblization is physical and chemically non selective. The ratio of polymer to additive or filler is typically what is conventionally used in a given application. To the polymer(s) and additive and/or filler is added about 0.1% by weight exfoliated clay to about 30% exfoliated clay. In a preferred embodiment, the polymer is melted in, for example, an extruder. To the melt, a quantity of exfoliated clay is added and thoroughly mixed together with the polymer(s). The exfoliated clay is preferably present in an amount of about 0.1% by weight up to about 30% by weight. To the molten blend of polymer and exfoliated clay is added the filler or additive in a conventional amount. In a preferred embodiment, the physical compatiblizing nanoclay is added in loading rates from 0.1% to 300% weight clay/weight polymer.

The exfoliated clay may be prepared from unmodified sodium bentonite, montmorillonites and/or smectites and, for example, a synthetic polymer such as polyacrylic acid (PAA) to obtain clay particle exfoliation and a nanocomposite material. Other synthetic polymers that may be used instead of polyacrylic acid include polyethylene oxide, polyvinyl alcohol and ethylene vinyl acetate (EVA). The preferred clays are hectorite, saponite, attapulgite, beidellite, stevensite, sauconite, nontorite, laponite, bentonite, smectite or montmorillonite. Preferably, the clay has been exfoliated in the thermoplastic melt phase by treating it with a quaternary ammonium salt (quaternary amine), Resorcinol Bis-Phosphate: RDP, or Bis-Phenol Diphosphate: BDP. Preferred loading ranges are from 1% weight dry clay/organic chemical exfoliating agent (OCEA) to 300% weight dry clay/OCEA. The clay is added mixes so the polymer receiving the nanoclay exhibits the individual clay crystals as dispersed and exfoliated throughout the plastic matrix of the polymer.

The blends may be prepared in any suitable vessel including an extruder, Brabender mixer, etc. The present invention has applicability in rotational molding applications, high shear injection molding, blow molding, single or multiscrew screw extrusion, parison blow molding as well as other extrusion methods including a static mix in line.

While the reasons for the superior compatibilization that is achieved in the present invention is not completely understood, it is believed that the clay diminishes the energy barrier in surface energy between the solid filler or additive and the polymer phase. This allows for ease of processing and a reduced need for expensive and specialized processing equipment associated with filler additives into plastics. The clay crystal actually deforms like a spring at the microscopic level and thus stores the surface energy difference which hinders "wetting" in the melt phase of the polymer and subsequent dispersion of the filler. Because of this effect the organic nanoclay is preferred to be added to the molten thermoplastic polymer upstream of the addition of a given filler or additive. As long as the nanoclay is dispersible into a given polymer by itself, the physical filler compatibilization occurs. Dramatic property changes in a filler addition can be noted with as little as 1% by weight-clay/to the polymer for low levels of fillers or additives. Where more amounts of fillers or additives are mixed with the polymer, the preferred amounts of exfoliated clay can be about 5% or where the filler amounts are about 20% by weight or more of the polymeric composition. Fillers that have a high auto-affinity which produce clumping and "lumps" in the plastic are thus evenly distributed by these nanoclays. Flame retardant packages which don't meet an approved flame rating will achieve the rating due to the more uniform spatial distribution of the flame retardant (FR) particle in the plastic matrix; and this at loading levels of the clay where the physical intervention of the clay in the flame retardant properties would normally be insufficient to explain their effect.

An examination of a variety of filled plastics under electron microscopy as well as mechanical and visual examination of filled thermoplastic samples reveals this effect to be consistent and general. The effect is generic and not limited to a specific thermoplastic polymer or filler as long as the nanoclay is first dispersible in the polymer phase. This eliminates the need for lengthy description of chemical specifics of these clays as long as they meet the dispersion criteria just mention. The clay particle acts as a physco-mechanical agent for the purposes of this invention. The use of a nanoclay which exfoliates in a thermoplastic prior to the addition of a solid state filler into the polymer phase for the purpose of absorbing the interstitial energy created at the interface by the surface energy difference between the filler material and the polymer; resulting in filler compatibilization within the polymer matrix. The resulting compatibilization is physically and chemically non selective.

The filler material can be any suitable filler material used in art. The filler is preferably an inert mineral filler added to lower the cost of the polymer. Other fillers can include a glass fiber or lignin or cellulose based fibers, ceramic particles, an inert silicate material, etc Where the product is a polymer concrete, gravel or sand or other minerals may be used. Other typical fillers include magnesium oxide (MgO), magnesium hydroxide $Mg(OH)_2$ Where flame retardant properties are sought the filler material may be a phosphorous based mineral. Other flame retardant fillers can be a solid phase organic flame retardant such as decabromodiphenyl ether (decabrome), antimony oxide or a char assisting agent such as talc or gypsum. The filler may also be an electrically conductive metal such as iron gold, silver, copper or any element in non oxidized pure metallic form which conducts electricity beyond the range of simple static dissipation. Another filler is a cross linked polymer material which is not a thermoplastic material and remains a solid during melt processing.

When a filler and a polymeric material are blended together any control material without the added compatiblizing nanoclay shows distinctly anisotropic dispersion throughout the polymer matrix while the same system the nanoclay compatiblizer with the same polymer species and the same filler material show significantly improved dispersion and uniformity as measured by;

a) changes in processing properties of the polymer/filler composite whereby problems associated with the addition of the filler into the melt blend can be demonstrated to be reduced or eliminated, or the loading rates of filler can be significantly increased while maintaining general desirable properties of the final thermoplastic composite b) the final product appears significantly smoother and more uniform to the naked eye c) the resulting composite material shows significant uniformity of dispersion of the filler using electron microscopy or visible microscopy methods.

I claim:

1. A method of forming a compatibilized blend of a polymeric material and one or more additives and/or fillers comprising blending said polymeric material with an exfoliated clay to form a blend, to said blend is added one or more additives and/or fillers, said exfoliated clay being comprised of a clay exfoliated with a resorcinol diphosphate or a bisphenol diphospate.

2. The method according to claim 1 wherein said filler and/or additive is a solid phase material.

3. The method according to claim 2 wherein said exfoliated clay is present in an amount of about 0.1 to about 30% by weight of the mixture.

4. The method according to claim 3 wherein the exfoliated clay is a nanoclay.

5. The method according to claim 4 wherein the clay is selected from the group consisting of a hectorite, saponite, attapulgite, beidellite, stevensite, sauconite, nontorite, laponite, bentonite, smectite and montmorillonite.

6. The method according to claim 5 wherein the exfoliated clay absorbs physical interstitial energy between the polymer phase and the solid additive and/or filler.

7. The method according to claim 5 wherein the polymer receiving the exfoliated clay exhibits individual clay crystals dispersed and exfoliated throughout the plastic matrix.

8. The method according to claim 5 where the filler material is an inert mineral filler.

9. The method according to claim 5 where the filler material is a phosphorous based mineral added for use as a flame retardant.

10. The method according to claim 5 wherein the filler is a solid phase organic flame retardant.

11. The method according to claim 10 wherein the filler is a decabromodiphenyl ether (decabrome).

12. The method according to claim 5 wherein the filler is antimony oxide.

13. The method according to claim 8 where the filler is a mineral used in making polymer concrete.

14. The method according to claim 8 where the filler is a glass fiber.

15. The method according to claim 8 where the filler is a char assisting agent or gypsum.

16. The method according to claim 15 wherein said char assisting agent is talc.

17. The method according to claim 15 wherein said char assisting agent is gypsum.

18. The method according to claim 8 wherein the filler is an inert silicate material.

19. The method according to claim 5 wherein the filler is magnesium oxide (MgO).

20. The method according to claim 5 wherein the filler is magnesium hydroxide $Mg(OH)_2$.

21. The method according to claim 5 where the filler is an electrically conductive metal, iron, gold, silver, copper or any element in non oxidized pure metallic form which conducts electricity beyond the range of simple static dissipation and blends thereof.

22. The method according to claim 21 wherein said electrically conductive metal comprises iron, gold, silver, copper or any element in non oxidized pure metallic form which conducts electricity beyond the range of simple static dissipation and blends thereof.

23. The method described in 1, 2, and 3 where the filler is a ceramic particle.

24. The method according to claim 5 wherein the filler is a lignin or cellulose based fiber.

25. The method according to claim 5 wherein the filler is a cross linked polymer material which is not a thermoplastic material and remains a solid during melt processing.

26. The method according to claim 2 where the general physical compatibilizing nanoclay is added in loading rates from 0.1% to 300% weight clay/weight polymer.

27. A polymeric composition comprising a compatibilized blend of a polymeric material, one or more solid phase additives and/or fillers and an exfoliated clay said exfoliated clay being comprised of a clay and resorcinol diphosphate or a bisphenol diphosphate said blend being macroscopically homogeneous mixture.

28. The composition according to claim 27 wherein said composition is formed by blending an exfoliated clay with said polymeric material followed by blending the mixture so formed with or more additives and/or fillers.

29. The composition according to claim 28 wherein said exfoliated clay is present in an amount of about 0.1 to about 30% by weight of the mixture.

30. The composition according to claim 29 wherein the exfoliated clay is a nanoclay.

31. The composition according to claim 30 wherein the clay is selected from the group consisting of a hectorite, saponite, attapulgite, beidellite, stevensite, sauconite, nontorite, laponite, bentonite, smectite and montmorillonite.

32. The method according to claim 1 wherein said blend comprises two or more polymers said polymers forming a macroscopically homogeneous mixture.

\* \* \* \* \*